United States Patent Office 2,769,732
Patented Nov. 6, 1956

2,769,732

PROCESS FOR PREPARING WATER-REPELLENT FABRIC AND RESULTING PRODUCT

Thomas Boyd, Springfield, Mass., assignor to Monsanto Chemical Company, St. Louis, Mo., a corporation of Delaware No Drawing. Application May 13, 1953,
Serial No. 354,891

22 Claims. (Cl. 117—161)

This invention relates to water-repellent fabrics. More particularly, the invention relates to a process for rendering fabrics water-repellent and to the fabrics treated thereby.

This application is a continuation-in-part of application Serial No. 159,665 filed May 2, 1950, and now abandoned.

One of the major problems in the textile industry is to provide a means for rendering the various natural and synthetic fabrics water-repellent so that they will not be spotted by rain, weakened or shrunk by washing in water or lose their shape on exposure to high relative humidities.

One object of this invention is to provide water-repellent natural and synthetic fabrics.

A further object is to provide a process for rendering natural and synthetic fabrics water-repellent.

Another object is to provide water-repellent fabrics which do not lose their water-repellency when subjected to laundering.

These and other objects are attained by depositing polymers and copolymers of titanium organic derivatives or copolymers of the titanium organic derivatives with silicon organic derivatives on natural and synthetic fibers and fabrics.

The following examples are given in illustration of this invention. Where parts are mentioned, they are parts by weight.

Example I

Bleached cotton muslin is saturated with a 1% solution of butyl orthotitanate polymer in anhydrous xylol. The solvent is then allowed to evaporate until the muslin is dry after which the muslin is subjected to an atmosphere having about 25% relative humidity for about 30 minutes. At the end of this time, the muslin is water-repellent and the coating is insoluble in xylol. In the standard spray test of the American Association of Textile Chemists and Colorists, the treated cloth has a spray rating of from 70 to 90. A striking example of the water-repellency of the treated fabric is shown by placing the treated muslin in a beaker of water at room temperature. The muslin is not wet by the water and therefore floats on the surface thereof. If the treated cloth is allowed to remain floating on the surface of the water, it remains unaffected for periods of several days. The treated cloth does not lose its resistance to water even after repeated launderings using soap and water or after repeated dry cleanings.

The titanium polymer used in Example I is prepared by polymerizing monomeric tetrabutyl orthotitanate in the presence of about 0.9 mol of water per mol of butyl titanate. The polymer is a viscous liquid which is soluble in anhydrous solvents such as xylene, benzene, petroleum naphtha, aliphatic hydrocarbons, chlorinated hydrocarbons, etc.

Example II

A strip of woolen flannel is dipped in a 1% solution of a polymeric stearyl orthotitanate in anhydrous solvent naphtha. Excess solution is wrung from the cloth, the solvent is allowed to evaporate until the flannel is dry and then a current of air at 10% relative humidity is passed over it for about one hour. The treated flannel has an AATCC spray rating of about 85. The water-repellency is unaffected by laundering and dry cleaning.

Example III

Cellulose acetate rayon fabric is impregnated with a 1% solution of polymeric lauryl orthotitanate in anhydrous hexane. The solvent is allowed to evaporate until the fabric is dry. The dry fabric is exposed to air having a relative humidity of about 50% for about 10 minutes. The treated rayon has a high spray rating, retains the rating after laundering and holds a press for extended periods of time in an atmosphere of about 80% relative humidity.

The titanium polymers of Examples II and III are prepared by polymerizing tetrastearyl orthotitanate monomer or tetralauryl orthotitanate monomer separately in the presence of from 0.8 to 0.9 mol of water per mol of monomer. Both polymers are waxy solids which are soluble in anhydrous hydrocarbon solvents.

Example IV

A strip of cotton muslin cloth is dipped in a 1% solution of a copolymer of tetrabutyl orthotitanate and dibutoxy dibutyl silane in anhydrous xylol. Excess solution is wrung from the fabric and the solvent is then allowed to evaporate until the cloth is dry. The cloth is then subjected to moist air for about 30 minutes. The treated fabric has a spray rating of about 90 in the AATCC test and may be laundered and dry-cleaned without losing water-repellent properties.

Example V

A strip of nylon cloth is impregnated with a 1% solution of a copolymer of tetrabutyl orthotitanate and tetrabutoxy silane in anhydrous xylol. The solvent is allowed to evaporate until the fabric is dry and then a current of moist air is passed over the fabric for about half an hour. The treated nylon is not wetted by water as evidenced by the fact that it will not sink when placed in a container of water. As a rule, nylon fabrics are considered water-resistant but they are generally wetted by water and will spot when water is splashed on them. Nylon treated with the polymers and copolymers of this invention is not wetted by water and will not spot when spattered with water.

Example VI

A strip of white linen cloth is roll-coated with a 1% solution in anhydrous xylene of a copolymer of tetrabutyl orthotitanate and tetrastearyl orthotitanate. The copolymer is prepared by reacting equimolecular amounts of the two monomers in xylene solution with about 0.9 mol of water per mol of monomer mixture. The coated cloth is freed from solvent in a stream of moist air having a relative humidity of about 30%. When all of the solvent is gone, the cloth is water-repellent even after laundering and dry cleaning.

Example VII

A copolymer is prepared by reacting an equimolecular mixture of tetrastearyl orthotitanate and diethyl distearyloxy silane with about 0.8 mol of water per mol of monomer mixture, the reaction being carried out in anhydrous xylene as a solvent. The copolymer solution thus produced is used to impregnate cotton sheeting. The xylene is removed from the sheeting by passing a current of moist air thereover. The dried sheet is water-repellent and does not lose this quality even after repeated launderings and dry cleanings.

The polymers and copolymers of this invention are prepared by reacting the respective monomers or monomer mixtures with limited amounts of water at room temperatures or at slightly elevated temperatures preferably in an anhydrous organic solvent. The amount of water used determines the extent of the polymerization and the nature of the polymers and copolymers produced. For the purposes of this invention, polymers and copolymers prepared by reacting the monomers or monomer mixtures with from 0.7 to 1.0 mol of water per mol of monomer or monomer mixture are preferred. Care should be used in the addition of the water to the monomer since too rapid addition in localized areas will produce titanium dioxide. To obtain the polymers, each mol of monomer or monomer mixture should be dissolved in at least 3 mols of an anhydrous organic solvent and the water should be mixed with an organic solvent compatible with the solvent for the reaction. The organic solvent solution of the water should be added to the monomer solution slowly and with constant agitation. These polymers and copolymers are new compounds which are disclosed and claimed in my copending applications Serial No. 122,844, filed October 21, 1949, and now abandoned; Serial No. 151,819, filed March 24, 1950, and now abandoned; Serial No. 268,341, now Patent No. 2,689,858, filed January 25, 1952 (a continuation-in-part of application Serial No. 122,844) and Serial No. 332,529, now Patent No. 2,716,656, filed January 21, 1953 (a continuation-in-part of application Serial No. 151,819).

The titanium polymers which may be used are the polymers of tetraorgano derivatives of orthotitanic acid including the tetra esters, tetra anhydrides and tetra amides. A large number of the monomeric compounds are known and have been prepared by the condensation of a titanium tetrahalide with an alcohol, phenol, acid, amine or imine. The monomers may also be prepared by the reaction of titanium disulfide with the alcohol, phenol, acid, amine or imine under anhydrous conditions as disclosed in Boyd Patents 2,579,413, 2,579,414 and 2,630,443. Although all of these titanium polymers will render textile materials water-repellent, the best results are obtained if the polymers of tetraalkyl orthotitanates in which the alkyl groups have from 10 to 20 carbon atoms are used. These alkyl groups may be saturated or unsaturated and include decyl, undecyl, lauryl, palmityl, oleyl, stearyl, myristal, docosanyl, etc. groups. Copolymers of a plurality of the titanium monomers may be used. The polymers prepared by the methods disclosed in the copending applications wherein from 0.7 to 1.0 mol of water is reacted with each mol of monomer or monomer mixture are essentially straight-chain polymers. The polymers and copolymers prepared solely from the titanium monomers have the formula:

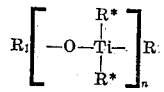

wherein $n$ is an integer greater than 1, each R* represents the same radical, R and R* are radicals taken from the group consisting of radicals having the formula

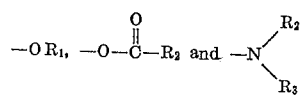

in which $R_1$ is a radical taken from the group consisting of alkyl, aryl, aralkyl, alkenyl and aralkenyl radicals, $R_2$ is a radical taken from the group consisting of alkyl and aryl radicals and $R_3$ is taken from the group consisting of hydrogen and $R_2$.

The titanium-silicon copolymers which may be used are copolymers of the titanium monomers described above with silicon compounds having the formula $$Si(OR)_nR_{(4-n)}$$

wherein each R is a monovalent hydrocarbon radical and $n$ is an integer from 1 to 4, inclusive. All of the R's may be the same or they may be different. The hydrocarbon radicals may be cyclic or acyclic, saturated, unsaturated, aliphatic or aromatic and include the alkyl, aryl, alkenyl, aralkenyl, cycloalkyl, cycloalkenyl and heterocyclic radicals such as methyl, ethyl, propyl, butyl, isobutyl, secondary butyl, tertiary butyl, amyl, hexyl, decyl, lauryl, oleyl, stearyl, palmityl, vinyl, allyl, chlorallyl, methallyl, crotyl, butadienyl, phenyl, dichlorophenyl, pentachlorophenyl, xylyl, benzyl, styryl, cinnamyl, furfuryl, cyclohexyl, cyclopentadienyl, cyclopentenyl, etc. radicals. Especially preferred silicon monomers are those in which one or more of the substituents on the silicon are alkyl groups having at least 10 carbon atoms such as lauryl, oleyl, palmityl, stearyl, myristyl, etc. radicals. Interpolymers may be prepared from three or more monomers at least one of which is taken from the titanium compounds and at least one other from the silicon compounds. The copolymers of the titanium compounds and the silicon compounds have the general formula given above for the titanium polymers and copolymers and contain in the polymer chain, additionally at least one radical having the formula:

wherein $R_4$ is a radical taken from the group consisting of $R_5$ and $OR_5$, $R_5$ being a hydrocarbon radical.

In preparing the copolymers of the titanium derivatives with each other or with the silicon derivatives, the ratio of the components may be varied at will depending on the properties desired in the final product. Thus, on a molar basis 1 mol of a titanium derivative may be copolymerized with from 0.01 to 100 mols of one or more different titanium derivatives or silicon derivatives. In considering the copolymers with silicon derivatives it is noted that a preponderance of silicon compound will yield a softer copolymer which will have a minimum effect on the hand of the treated fabrics.

In general, it is convenient to carry out the polymerization or copolymerization in the solvent which is to be used in applying the polymeric material to the fabrics. Among such solvents are aliphatic and aromatic hydrocarbons such as hexane, mineral spirits, solvent naphtha, benzene, toluene, xylene, etc. Using these solvents, the polymers and copolymers may be applied to the fabrics from the reaction medium in which they are formed and it is unnecessary to recover them in a pure form.

The polymers and copolymers are applied to the fabrics from a dilute solution containing from about 1 to about 10% polymer or copolymer by weight. The solutions may be applied by spraying, dipping, roll coating and other conventional methods. A pick-up on the fabric of about 1–3% by weight of polymeric material based on the weight of the fabric is sufficient to thoroughly impregnate the fabric and render it water-repellent. This amount does not materially affect the hand of the material. Larger amounts may be used if a weighting effect is desired.

After the fabric has been coated or impregnated, the only treatment necessary to render it water-repellent is to drive off the solvent and expose the dry material to a moisture-containing atmosphere. Since most of the solvents used are quite volatile at room temperatures, the drying process may consist simply of exposing the material to rapidly circulating air. If faster drying is required, heated air may be used. In either case, the solvents may be easily recovered by passing the drying medium through a condenser after it has passed over the treated fabric.

To complete the process, the fabrics carrying the polymer or copolymer are exposed to a moist atmosphere having a relative humidity of at least 10%. The treatment with a moisture-containing atmosphere renders the polymeric material insoluble in organic solvents and makes it possible to dry clean the treated fabrics without loss of water-repellency. The treatment with a moist atmosphere should last for from 10 minutes to about 1 hour depending upon the amount of moisture in the air, i. e., larger amounts of moisture require a shorter exposure time to complete the insolubilization of the coating. If desired, the air or other drying medium used for removing solvent may contain the necessary moisture to complete the process.

The polymers and copolymers of this invention are not to be confused with polymers and copolymers obtained by vinylic polymerization, i. e., polymerization dependent on vinylidene or allyl groups. The vinylic polymers and copolymers have entirely different chemical and physical properties from those of the polymers of this invention.

Any of the natural and synthetic fiber woven or felted fabrics which either absorb water or are wetted by water may be rendered water-repellent with the titanium polymers and copolymers. Among the materials which may be advantageously treated are cotton, linen, ramie, wool, viscose rayon, cellulose acetate rayon, nylon, etc., fibers and fabrics. In some cases, it may be desirable to treat the fibers and filaments before they are made into fabrics.

This invention makes it possible to render natural and synthetic fibers water-repellent by a simple and easily controlled process. The fabrics so produced remain water-repellent after repeated launderings with water and detergents and after dry cleaning operations. Furthermore, the hand of the treated fabrics is substantially unaltered by the coatings and impregnants of the invention except in those cases where a deliberate harshening of the hand is procured by depositing more than 3% of polymer or copolymer on the fabrics.

It is obvious that many variations may be made in the products and processes of this invention without departing from the spirit and scope thereof as defined in the appended claims.

What is claimed is:

1. A process for preparing a water-repellent fabric which comprises treating a fabric with an anhydrous organic solvent solution of a straight-chain, titanimum-containing polymer, said solution of titanium-containing polymer being homogeneous and free of suspended insoluble constituents, removing the solvent and exposing the treated fabric to an atmosphere containing moisture, said titanium-containing polymer consisting essentially of a compound taken from the group consisting of homopolymers of tetraorgano derivatives of orthotitanic acid, interpolymers of a plurality of said tetraorgano derivatives and copolymers of said tetraorgano derivatives with organo silanes, said homopolymers and said interpolymers of said tetraorgano derivatives having the formula:

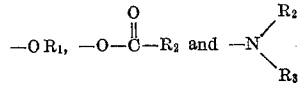

wherein $n$ is an integer greater than 1, $R_1$ is taken from the group consisting of alkyl, aryl, aralkyl, alkenyl, and aralkenyl radicals, and R and R* are taken from the group consisting of radicals having the formula:

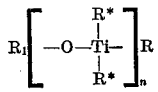

$R_1$ having the significance given above, $R_2$ being taken from the group consisting of alkyl and aryl radicals and $R_3$ being taken from the group consisting of hydrogen and $R_2$, said copolymers of said tetraorgano derivatives with said organo silanes having the general formula given above and containing, additionally, in the polymer chain, at least one radical having the formula:

wherein $R_4$ is a radical taken from the group consisting of $R_5$ and $—OR_5$, $R_5$ being a hydrocarbon radical, said straight-chain, titanium-containing polymers having been prepared by dissolving 1 molar proportion of the corresponding monomer in at least 3 molar proportions of anhydrous organic solvent, dissolving 0.7 to 1 molar proportion of water in an organic solvent compatible with the monomer solution and slowly adding the water solution to the monomer solution with constant agitation.

2. A process as in claim 1 wherein the titanium-containing polymer is a homopolymer of a tetraorgano derivative of orthotitanic acid.

3. A process as in claim 2 wherein the tetraorgano derivative is a tetraalkyl derivative, the alkyl groups containing from 10 to 20 carbon atoms.

4. A process as in claim 3 wherein the tetraalkyl orthotitanate is tetrastearyl orthotitanate.

5. A process as in claim 3 wherein the tetraalkyl orthotitanate is tetralauryl orthotitanate.

6. A process as in claim 1 wherein the titanium-containing polymer is a copolymer of a tetraorgano derivative of orthotitanic acid and at least one other tetraorgano derivative of orthotitanic acid.

7. A process as in claim 1 wherein the titanium-containing polymer is a copolymer of a tetraorgano derivative of orthotitanic acid and an organo silane.

8. A process as in claim 7 wherein the copolymer is a copolymer of tetrastearyl orthotitanate and diethyl di(stearyloxy) silane.

9. A water-repellent fabric having deposited thereon a titanium-containing polymer, said titanium-containing polymer having been deposited upon the fabric by the method of claim 1.

10. A water-repellent fabric as in claim 9 wherein the titanium-containing polymer is a homopolymer of a tetraorgano derivative of orthotitanic acid.

11. A water-repellent fabric as in claim 10 wherein the tetraorgano derivative of orthotitanic acid is a tetraalkyl orthotitanate, the alkyl groups containing from 10 to 20 carbon atoms.

12. A water-repellent fabric as in claim 11 wherein the tetraalkyl orthotitanate is tetrastearyl orthotitanate.

13. A water-repellent fabric as in claim 11 wherein the tetraalkyl orthotitanate is tetralauryl orthotitanate.

14. A water-repellent fabric as in claim 9 wherein the titanium-containing polymer is a copolymer of a tetraorgano derivative of orthotitanic acid and at least one other tetraorgano derivative of orthotitanic acid.

15. A water-repellent fabric as in claim 9 wherein the titanium-containing polymer is a copolymer of a tetraorgano derivative of orthotitanic acid and an organo silane.

16. A water-repellent fabric as in claim 15 wherein the copolymer is a copolymer of tetrabutyl orthotitanate and dibutoxy dibutyl silane.

17. A water-repellent fabric as in claim 15 wherein the copolymer is a copolymer of tetrabutyl orthotitanate and tetrabutoxy silane.

18. A water-repellent fabric as in claim 15 wherein the copolymer is a copolymer of tetrastearyl orthotitanate and diethyl di(stearyloxy) silane.

19. A process for preparing a water-repellent fabric of soft hand which comprises the steps of preparing a solution of 1–10 parts of a straight-chain, titanium-containing polymer in 100 parts by weight of an anhydrous organic solvent, said solution of titanium-containing polymer being homogeneous and free of suspended insoluble constituents, treating a fabric with said solution to deposit thereon an amount of said solution sufficient to provide a pick-up by the fabric of 1-3% by weight of said polymer, based on the weight of the fabric, and exposing the thus-treated fabric for 10-60 minutes to an atmosphere having at least 10% humidity to insolubilize said polymer on the fabric, said polymer being taken from the group consisting of homopolymers of tetraorgano derivatives of orthotitanic acid, interpolymers of a plurality of said tetraorgano derivatives and copolymers of said tetraorgano derivatives with organo silanes, said homopolymers and said interpolymers of said tetraorgano derivatives having the formula:

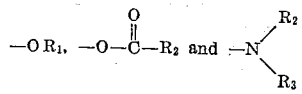

wherein $n$ is an integer greater than 1, $R_1$ is taken from the group consisting of alkyl, aryl, aralkyl, alkenyl, and aralkenyl radicals, and R and R* are taken from the group consisting of radicals having the formula:

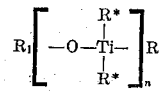

$R_1$ having the significance given above, $R_2$ being taken from the group consisting of alkyl and aryl radicals and $R_3$ being taken from the group consisting of hydrogen and $R_2$, said copolymers of said tetraorgano derivatives with said organo silanes having the general formula given above and containing, additionally, in the polymer chain, at least one radical having the formula:

wherein $R_4$ is a radical taken from the group consisting of $R_5$ and $-OR_5$, $R_5$ being a hydrocarbon radical, said straight-chain, titanium-containing polymers having been prepared by dissolving 1 molar proportion of the corresponding monomer in at least 3 molar proportions of anhydrous organic solvent, dissolving 0.7 to 1 molar proportion of water in an organic solvent compatible with the monomer solution and slowly adding the water solution to the monomer solution with constant agitation.

20. A process as in claim 19 wherein the titanium-containing polymer is a homopolymer of a tetraalkyl derivative, the alkyl groups containing 10 to 20 carbon atoms.

21. A process as in claim 20 wherein the tetraalkyl derivative is tetrastearyl orthotitanate.

22. A process as in claim 20 wherein the tetraalkyl derivative is tetralauryl orthotitanate.

References Cited in the file of this patent

UNITED STATES PATENTS

| | | |
|---|---|---|
| 2,512,058 | Gulledge | June 20, 1950 |
| 2,621,193 | Langkammerer | Dec. 9, 1952 |

FOREIGN PATENTS

| | | |
|---|---|---|
| 125,450 | Australia | Sept. 25, 1947 |